Nov. 25, 1924.  
O. F. NYLEN  
1,516,781  
CONDUIT SUPPORT FOR ELECTRICAL APPARATUS  
Filed May 21, 1923
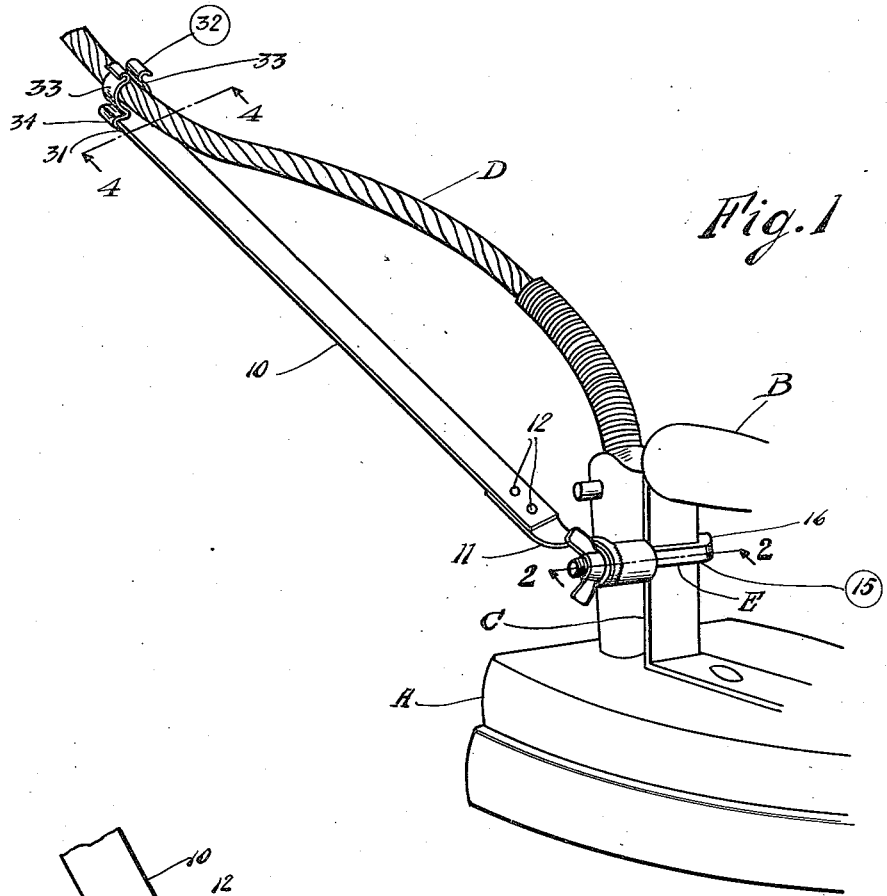
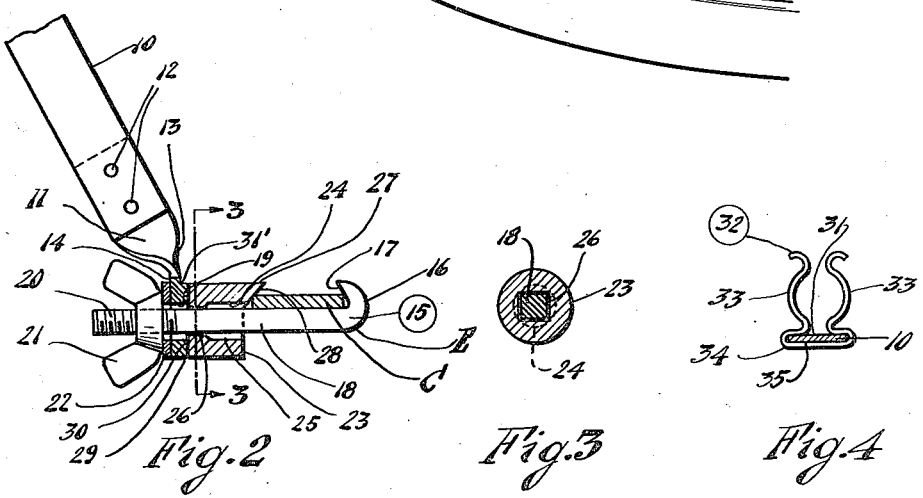
Witnesses:
Inventor:
Oscar F. Nylen
By Joshua R. H. Potts
His Attorney.

Patented Nov. 25, 1924.

1,516,781

UNITED STATES PATENT OFFICE.

OSCAR FABIAN NYLEN, OF CHICAGO, ILLINOIS.

CONDUIT SUPPORT FOR ELECTRICAL APPARATUS.

Application filed May 21, 1923. Serial No. 640,331.

*To all whom it may concern:*

Be it known that I, OSCAR FABIAN NYLEN, a citizen of the United States, and a resident of the city of Chicago, county of Cook, and State of Illinois, have invented certain new and useful Improvements in Conduit Supports for Electrical Apparatuses, of which the following is a specification.

My invention relates to conduit supports for electrical apparatuses, such as for example an electric sad iron and has for its principal object the provision of an improved construction of this character which will be highly efficient in use and economical in manufacture.

Among other objects of the invention is the provision of an attachment of the character to be hereinafter described and set forth which can be readily attached and detached from the device with which it is used and which is provided with an attachment adapted to hold the electric conduit of the device in an out of way position from interference with the arm or body of the one operating the device. The attachment, as will be apparent from the description to follow, is arranged and adapted to support a portion of the electric conduit in an elevated position preventing such portion of the conduit from resting on and dragging along the surface over which the device is manipulated.

Other objects will appear hereinafter.

The invention consists in the combinations and arrangements of parts hereinafter described and claimed.

The invention will be best understood by reference to the accompanying drawing forming a part of this specification, and in which, Fig. 1, is a perspective view of an electric sad iron showing the invention associated therewith;

Fig. 2, is a fragmentary sectional view of the invention taken substantially on line 2—2 of Fig. 1;

Fig. 3, is a sectional view of the same taken substantially on line 3—3 of Fig. 2, and Fig. 4 is a sectional view of the same taken substantially on line 4—4 of Fig. 1.

Referring to the drawing A indicates an electric device, which in the present instance is an electric sad iron; B indicates the handle through the medium of which the device A is manipulated, the handle being carried by an upright member C; D indicates an electric conduit carrying the conductor wires (not shown) supplying electric energy to the device A.

The parts so far indicated and described will be found to constitute parts of any electric sad iron of the approved type and while I have selected an electric sad iron to illustrate the utility of the invention it is to be borne in mind that the invention can be associated with other electrical devices without lessening the essence of its utility.

The preferred form of construction, as illustrated in the drawing, includes an elongated member 10, formed of suitable material, having an extended portion 11 at one end thereof and fixed thereto by rivets indicated at 12. The free end of the extended portion 11 is twisted as at 13 with its sides 14 extending in a vertical plane and bent at an angle offsetting the twisted portion from the longitudinal axis of the member 10. While in the present instance I have illustrated the extended portion as a separate piece of material fixed to the member 10, it will be apparent that the extended portion can be a continuation of the member 10.

Means is provided for detachably securing the member 10 to some part of the electrical device which in the present instance the drawing illustrates the device as being attached to the handle support C of the device A. This means in the present instance comprises a clamp E including a clamp member 15 having a curved end portion 16 provided with an inwardly bevelled edge surface 17. The shank 18 of the clamp member 15 which is preferably square in cross section passes through a square-shaped opening 19 formed in the twisted end portion of the extension and is provided with a screw-threaded portion 20 for threaded engagement with a wing-nut 21 which when threaded on the threaded portion bears against a washer 22 interposed between the wing-nut and the twisted portion of the extension. The shank 18 of the clamp member 15 carries a cooperating clamp member 23 which is preferably cylindrical in shape and provided with a passage 24 through which the shank passes, part of the passage being formed circular in cross section as indicated at 25 and the remainder square-shaped, as indicated at 26.

The clamp member 23 is provided with an extended lip portion 27 bevelled downwardly to provide an inwardly inclined edge surface as at 28. The end of the clamp member 23 adjacent the twisted portion has a roughened surface 29 contacting with a roughened surface 30 of a boss 31' formed on the extended portion as best shown in Fig. 3. This provision is such that the coming together of the roughened surfaces will help to hold the clamp members 15 and 23 from turning when the wing-nut 21 is manipulated to bring the clamp parts into clamping engagement with the upright portion C.

The member 10 inclines upwardly and rearwardly from the device A and carries at its upper extremity as at 31 a bifurcated clip 32 which is adapted to have clamping engagement with the adjacent portion of the conduit D. The clip 32 includes oppositely disposed fingers 33 formed of resilient material and carrying a portion 34 bent to form a slot 35 into which the end 31 of the member 10 is inserted and fixed thereto.

Due to the offset twisted portion 13 of the member 10 the member extends in a diverging direction with respect to the longitudinal axis of the device A and when the clip is fixed to the conduit the conduit is held in an out of the way position alleviating interference thereof with the arm or body of the one operating the device. The member 10 extending rearwardly and upwardly supports an appreciable length of the conduit above the surface of the object or article over which the device A is manipulated.

It will be apparent from the description herein that in accomplishing the objects set forth that I provide a device which can be manufactured at an economical cost and which can be readily attached and detached to the device with which it is used.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A sadiron attachment including a member adapted to be releasably clamped to a portion of the handle of the sadiron, a member inclined upwardly and rearwardly from the sadiron, an extension on said member having a portion offset relatively to the longitudinal axis of the inclined member and detachably carried by the first named member, and a bifurcated clip at the upper end of the inclined member for releasable attachment to the conduit.

2. A sadiron attachment including in combination with a conduit leading thereto, of a member inclined upwardly and rearwardly from the sadiron and having an extended portion offset relatively with respect to the longitudinal axis of the member and having means of attachment to the sadiron, and a bifurcated clip at the upper end of the inclined member for attachment to the conduit.

3. A sadiron attachment including a clamp comprising parts having opposite bevelled surfaces for clamping engagement with a portion of the handle of the sadiron and mounted for relative movement with respect to each other, a member inclined upwardly and rearwardly from the sadiron and having an offset portion with an opening through which one of the parts are adapted to be taken for securing the member to the clamp, and means at the upper end of the member adapted to releasably hold a conduit leading to the sadiron.

4. A sadiron attachment including in combination with a conduit leading thereto, of a member inclined upwardly and rearwardly from the sadiron with a portion offset relatively with respect to the longitudinal axis of the member and having means of attachment to the sadiron and the conduit, said member being adapted to releasably hold a portion of the conduit offset with respect to the remaining portion of the conduit between the attachment thereto and the attachment of the conduit to the sadiron.

In testimony whereof I have signed my name to this specification in the presence of two subscribing witnesses.

OSCAR FABIAN NYLEN.

Witnesses:
MARGARET AUER,
FREDA C. APPLETON.